United States Patent
Rothhämel

(10) Patent No.: US 10,974,716 B2
(45) Date of Patent: Apr. 13, 2021

(54) METHOD AND DEVICE FOR ADJUSTING A CONTROLLER OF A TRANSPORTATION VEHICLE AND CONTROL SYSTEM FOR A TRANSPORTATION VEHICLE

(71) Applicant: VOLKSWAGEN AKTIENGESELLSCHAFT, Wolfsburg (DE)

(72) Inventor: Malte Rothhämel, Huddinge (SE)

(73) Assignee: Volkswagen Aktiengesellschaft

( * ) Notice: Subject to any disclaimer, the term of this patent is extended or adjusted under 35 U.S.C. 154(b) by 167 days.

(21) Appl. No.: 16/087,188

(22) PCT Filed: Mar. 22, 2017

(86) PCT No.: PCT/EP2017/056826
§ 371 (c)(1),
(2) Date: Sep. 21, 2018

(87) PCT Pub. No.: WO2017/174361
PCT Pub. Date: Oct. 12, 2017

(65) Prior Publication Data
US 2019/0100195 A1    Apr. 4, 2019

(30) Foreign Application Priority Data
Apr. 7, 2016 (DE) .................. 10 2016 205 780.4

(51) Int. Cl.
*B60W 30/02* (2012.01)
*B60W 30/12* (2020.01)
(Continued)

(52) U.S. Cl.
CPC .......... *B60W 30/025* (2013.01); *B60W 30/12* (2013.01); *G06N 3/08* (2013.01);
(Continued)

(58) Field of Classification Search
CPC .............. B60W 30/025; B60W 30/12; B60W 2556/50; B60W 2552/30;
(Continued)

(56) References Cited

U.S. PATENT DOCUMENTS

| 5,895,435 A | 4/1999 | Ohta et al. |
| 8,744,689 B2 | 6/2014 | Yamakado et al. |

(Continued)

FOREIGN PATENT DOCUMENTS

| AT | 512251 A2 | 6/2013 |
| DE | 19748718 A1 | 5/1999 |

(Continued)

OTHER PUBLICATIONS

Search Report for German Patent Application No. 10 2016 205 780.4; dated Nov. 3, 2016.

(Continued)

*Primary Examiner* — Aaron L Troost
(74) *Attorney, Agent, or Firm* — Barnes & Thornburg LLP

(57) ABSTRACT

A method for adjusting a controller of a transportation vehicle includes receiving transportation vehicle state information and information about a current value of at least one variable controller parameter of the controller, calculating a setpoint value for the variable controller parameter, and outputting the setpoint value for the variable controller parameter. The calculating the setpoint value includes using an artificial neural network based on the transportation vehicle state information and the information about the current value of the variable controller parameter.

13 Claims, 2 Drawing Sheets

(51) Int. Cl.
*G06N 3/08* (2006.01)
*B60W 50/00* (2006.01)

(52) U.S. Cl.
CPC ............... *B60W 2050/0008* (2013.01); *B60W 2050/0014* (2013.01); *B60W 2050/0086* (2013.01); *B60W 2050/0088* (2013.01); *B60W 2510/202* (2013.01); *B60W 2520/10* (2013.01); *B60W 2540/043* (2020.02); *B60W 2540/10* (2013.01); *B60W 2540/12* (2013.01); *B60W 2540/18* (2013.01); *B60W 2540/30* (2013.01); *B60W 2552/30* (2020.02); *B60W 2556/50* (2020.02)

(58) Field of Classification Search
CPC ....... B60W 2540/043; B60W 2540/30; B60W 2540/12; B60W 2540/18; B60W 2540/10; B60W 2050/0088; B60W 2050/0086; B60W 2050/014; B60W 2050/0008; B60W 2520/10; B60W 2510/202; G06N 3/08

See application file for complete search history.

(56) References Cited

U.S. PATENT DOCUMENTS

| | | | |
|---|---|---|---|
| 8,965,621 B1* | 2/2015 | Urmson | B60T 7/22 |
| | | | 701/23 |
| 2015/0284008 A1* | 10/2015 | Tan | B60W 30/12 |
| | | | 701/28 |
| 2017/0269600 A1* | 9/2017 | Pink | G05D 1/0214 |
| 2017/0369052 A1* | 12/2017 | Nagy | B60W 30/14 |

FOREIGN PATENT DOCUMENTS

| | | |
|---|---|---|
| DE | 102004029790 A1 | 1/2006 |
| DE | 102013205950 A1 | 10/2013 |
| DE | 102013210941 A1 | 12/2014 |
| DE | 102014009415 A1 | 12/2015 |
| EP | 2629243 A1 | 8/2013 |

OTHER PUBLICATIONS

Search Report for International Patent Application No. PCT/EP2017/056826; dated Jul. 24, 2017.

* cited by examiner

METHOD AND DEVICE FOR ADJUSTING A CONTROLLER OF A TRANSPORTATION VEHICLE AND CONTROL SYSTEM FOR A TRANSPORTATION VEHICLE

PRIORITY CLAIM

This patent application is a U.S. National Phase of International Patent Application No. PCT/EP2017/056826, filed 22 Mar. 2017, which claims priority to German Patent Application No. 10 2016 205 780.4, filed 7 Apr. 2016, the disclosures of which are incorporated herein by reference in their entireties.

SUMMARY

Illustrative embodiments relate to the adaptive adjustment of controllers in the transportation vehicle. In particular, illustrative embodiments relate to a method and a device for adjusting a controller of a transportation vehicle. Furthermore, illustrative embodiments relate to a control system for a transportation vehicle.

BRIEF DESCRIPTION OF THE DRAWINGS

Exemplary embodiments are described in detail below with reference to the accompanying figures. In the figures.

DETAILED DESCRIPTION

Figure 1:
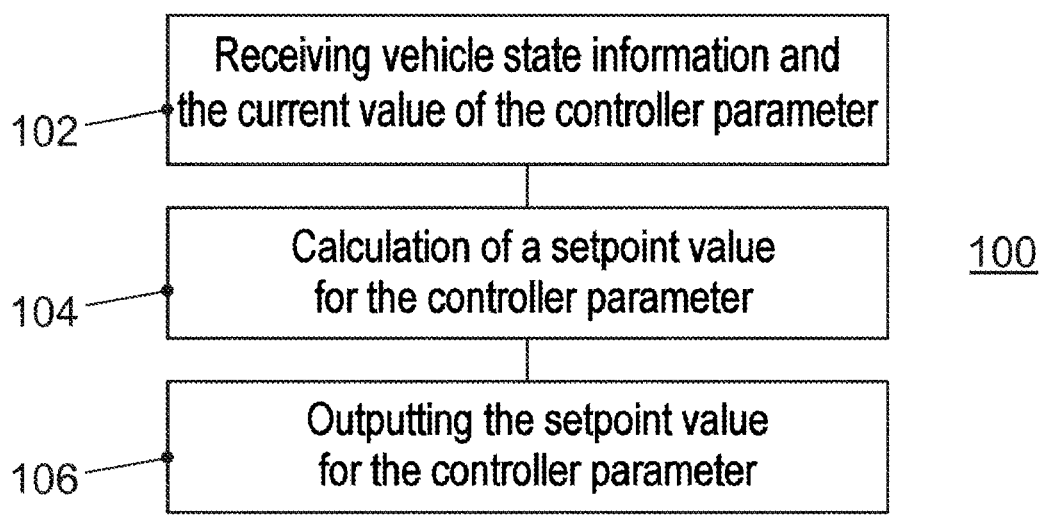
FIG. 1 shows a flow chart of an exemplary embodiment of a method for adjusting a controller of a transportation vehicle.

Controllers are widely used in transportation vehicles. A transportation vehicle can be both a passenger vehicle and a utility vehicle. Controllers are used in transportation vehicles, for example, for controlling the engine or even in driver assistance systems. The controller used must be both stable and robust for this. Artificial neural networks do not satisfy the aforementioned criteria for stability and robustness, and therefore they are not used as controllers in transportation vehicles despite the general suitability thereof and the marked adaptability thereof. Conventional (classic) controllers are only adaptive to a very limited extent, and therefore control by a conventional controller, for example, cannot be perceived by a user of the transportation vehicle as adapted to their needs.

In the document EP 2 629 243 A1, a method for detecting and tracking lane markings is shown. For classifying candidates for lane markings, an artificial neural network is used. However, no adaptable controllers for transportation vehicles are revealed in the document EP 2 629 243 A1.

The document DE 10 2013 205 950 A1 reveals a method for the detection of edges of roads. For classifying candidates for edges of roads, an artificial neural network is used. However, no adaptable controllers for transportation vehicles are revealed in the document DE 10 2013 205 950 A1 either.

In the document U.S. Pat. No. 8,744,689 B2, a device for controlling a transportation vehicle is revealed. Depending on a lateral acceleration of the transportation vehicle, the transportation vehicle is decelerated or accelerated when turning. In addition, the transportation vehicle can give information regarding ideal braking, steering or acceleration phases to a driver. Thus "monitored learning", also known as a learning method for neural networks, is possible for the driver. Again, no adaptable controllers for transportation vehicles are revealed in the document U.S. Pat. No. 8,744,689 B2.

There is thus a need to provide a capability to adapt a control strategy of a controller of a transportation vehicle as required.

Disclosed embodiments provide a method for adjusting a controller of a transportation vehicle. A controller is a device or a routine that automatically influences one or more (physical) variables so that a specified value can be maintained very well, even in the presence of disturbance effects. A controller continuously compares a control variable (setpoint value) with a controlled variable (actual value) within a control loop, and from the difference of the two variables—the control error (control difference)—determines a final control variable that influences a control path so that the control error is at a minimum in the settled state. The controller can, for example, be a proportional controller (P-controller), a proportional-integral controller (PI-controller), a proportional-integral-derivative controller (PID-controller), a proportional-derivative controller (PD-controller) or an integral controller (I-controller). According to the disclosed embodiments, the controller comprises at least one variable controller parameter for this, i.e., at least one parameter of the controller equation is variable or adjustable.

The disclosed method includes receiving transportation vehicle state information and information about a current value of the variable controller parameter. The transportation vehicle state information is data that characterize a state of the transportation vehicle. In this case, for example, it can be (physical) parameters measured in the transportation vehicle, such as, for example, acceleration, tilt, torque, voltage, current, transportation vehicle position, etc. or even variables derived therefrom. The transportation vehicle state information can further include a deviation of an actual value from a setpoint value of the variable that is controlled by the controller. Depending on the controller that is to be adjusted, the transportation vehicle state information can include information about one or more variables. The current value of the variable controller parameter indicates the current value for the variable controller parameter that is being used by the controller.

The disclosed method further includes a calculation of a setpoint value for the variable controller parameter on the basis of the transportation vehicle state information and the information about the current value of the variable controller parameter. In this case, the calculation is carried out using an artificial neural network. An artificial neural network is a network of artificial neurons (for example, McCulloch-Pitts neurons), which can be trained following the construction thereof to adapt as required. In this case, the artificial neural network can comprise a number of different topologies. For example, the artificial neural network can be a single layer or a multi-layer feedforward network or a recurrent network.

The disclosed method further includes outputting the setpoint value for the variable controller parameter to the controller. The information required to adjust the variable controller parameter accordingly can thus be provided to the controller.

The adaptability of artificial neural networks can be used to adapt the variable controller parameter, i.e., the control strategy of the controller, as required. For example, characteristics or peculiarities of a user (driver) can be extracted by the artificial neural network from the transportation vehicle state information and taken into account for the calculation of the setpoint value for the variable controller parameter.

Accordingly, the control strategy can be adapted to the user. The control can therefore be perceived by the user as adapted to their needs. More generally, the control strategy can be adapted to the variables comprised by the transportation vehicle state information (for example, the state of the road, the course of the road).

In some exemplary embodiments, the method therefore further includes receiving the setpoint value for the variable controller parameter by the controller and adjusting the variable controller parameter to the setpoint value for the variable controller parameter by the controller. Thus, for example, adjustment of the controller or the control strategy to the needs of the user of the transportation vehicle is carried out as required. The control can therefore be carried out better adapted to the needs of the user, for example.

According to some exemplary embodiments, an allowed range of values for the variable controller parameter is specified. By specifying the allowed range of values, stability and robustness can be ensured. For example, the range of values can be limited to values for which stability and robustness of the controller have been verified. The calculation of the setpoint value for the variable controller parameter therefore further includes checking whether the calculated setpoint value for the variable controller parameter is included in the range of values. An internal verification is thus carried out during the calculation of the setpoint value of whether the calculated setpoint value is within the allowed range of values. If the calculated setpoint value for the variable controller parameter is not included in the range of values, the method therefore further includes changing the calculated setpoint value for the variable controller parameter to a value from the allowed range of values with a minimum difference from the calculated setpoint value for the variable controller parameter. The setpoint value for the variable controller parameter is thus set to the allowed value that is closest to the actual calculated setpoint value. In this way, stability and robustness of the controller can be ensured, but also the best possible adjustment of the control strategy to the specific circumstances (for example, the user's wishes).

In some exemplary embodiments, an allowed range of values for the variable controller parameter is again specified. In this case, the method comprises checking by the controller of whether the calculated setpoint value for the variable controller parameter is included in the range of values. If the calculated setpoint value for the variable controller parameter is not included within the range of values, the method includes adjusting the variable controller parameter by the controller to a value from the allowed range of values with a minimum difference from the calculated setpoint value for the variable controller parameter. The verification of whether the calculated setpoint value lies within the allowed range of values is thus carried out by the controller itself. In this way, stability and robustness of the controller can again be ensured, but also a best possible adjustment of the control strategy to the specific circumstances (for example, the user's wishes).

According to some exemplary embodiments, the transportation vehicle state information includes a deviation of an actual value from a setpoint value of the variable controlled by the controller and/or a steering wheel angle (i.e., the angle of the steering wheel relative to a null position during straight-ahead travel of the transportation vehicle) and/or a steering wheel torque (i.e., torque on the steering column) and/or a position of a transportation vehicle pedal (for example, the gas pedal or the brake pedal) and/or a speed of the transportation vehicle and/or a position of the transportation vehicle within a lane. The aforementioned characteristics can indicate a wish of a user or a peculiarity of the user, to which the control strategy can be adapted to enable control that is adapted to the user.

For example, the position of the transportation vehicle within a lane can indicate whether the user of the transportation vehicle usually moves more on the left, more in the center or more on the right within the lane. Accordingly, for example, a controller parameter of a controller of a driver assistance system can be adjusted for the usual, i.e., preferred, position within the lane, so that the driver assistance system can enable improved support for the user.

In some exemplary embodiments, the method further includes receiving information about a user of the transportation vehicle. The information about the user of the transportation vehicle is specific characteristics of a user. The information about the user of the transportation vehicle includes, for example, information that characterizes a driving style or a driving characteristic of a user. In the disclosed method, the calculation also further bases the setpoint value for the variable controller parameter on the information about the user of the transportation vehicle. Accordingly, the control strategy can be still better adapted to the peculiarities of the user of the transportation vehicle.

According to some exemplary embodiments, the information about the user of the transportation vehicle includes a transportation vehicle setting of the user and/or a steering characteristic of the user and/or a pedal characteristic of the user. The transportation vehicle setting can, for example, be a setting of a mirror, a seat or the steering wheel of the transportation vehicle. The steering characteristic can, for example, specify whether a user steers more gently or more roughly. The steering characteristic can thus indicate a steering behavior preferred by the user of the transportation vehicle. The pedal characteristic can, for example, indicate whether a user depresses the gas pedal or the brake pedal more gently or more energetically. The pedal characteristic can thus give an indication about a preferred acceleration behavior or braking behavior of the user. Taking one or more of the aforementioned parameters for the determination of the setpoint value of the controller into account can thus adapt the control strategy better to the wishes or habits of the user.

In some exemplary embodiments, the method further includes receiving road data and information about a current position of the transportation vehicle. The road data can, for example, be data that indicate the course of the road or even a state of a road. The information about a current position of the transportation vehicle can, for example, include the coordinates of the transportation vehicle and can be received by a suitable navigation service (for example, Global Positioning System, GPS; GLObal Navigation Satellite System, GLONASS; Galileo or Beidou). The calculation of the setpoint value for the variable controller parameter is further based here on the road data and the information about the current position of the transportation vehicle. For example, the course of the road that is to be traversed next and a state thereof (for example, poor road conditions) can be determined from the road data and the current position of the transportation vehicle. Accordingly, the control strategy can be adapted to the course of the road that is to be traversed. Thus, for example, the control of a driver assistance system can be adapted to the course of the road (for example, using different values of the controller parameter for a meandering course of the road than for a more linear course of the road). The control for an Anti-Lock System (ABS) of the transportation vehicle can also be adapted to the state of the road to enable improved braking behavior of the transportation vehicle, for example.

According to some exemplary embodiments, the road data include a radius of a turn and/or a length of a turn. The aforementioned characteristics can be used especially for the adjustment of driver assistance systems to the real course of the road.

In some exemplary embodiments, the controller is therefore a controller of a driver assistance system. The driver assistance system is an additional (electronic) device in the transportation vehicle for assisting the user in certain driving situations. The driver assistance system can, for example, intervene partly autonomously or autonomously in drive, controlling or signaling devices of the transportation vehicle or can warn the driver by suitable man-machine interfaces shortly before or during critical situations. The driver assistance system can, for example, be an ABS, an (electronic) braking assistant, a parking aid, an electronic stability program (ESP), an automatic distance controller, a lane keeping assistant or a lane changing assistant. Because of the learning capability of the artificial neural network, one or more variable controller parameters of the controller of the driver assistance system can be adapted to the needs and wishes of the user of the transportation vehicle. Accordingly, the assistance of the driver assistance system can be perceived by the user of the transportation vehicle as less rigid and thus as being adapted to their needs.

According to some exemplary embodiments, the controller is a controller of an autonomous driving system of the transportation vehicle. The autonomous driving system is an additional (electronic) device in the transportation vehicle that can control the transportation vehicle without the influence of a human driver. The autonomous driving system can, for example, detect the surroundings of the transportation vehicle using different sensors for this purpose, and from the information obtained can determine the own position thereof and the other road users. To drive to the destination, the driver assistance system can, for example, autonomously intervene in drive, controlling or signaling devices of the transportation vehicle. Because of the learning capability of the artificial neural network, one or more variable controller parameters of the controller of the autonomous driving system of the transportation vehicle can be adapted to specific driving situations. In other words: The artificial neural network can be trained to adapt controller parameters of the controller of the autonomous driving system to certain driving situations. Accordingly, an improved control outcome can be enabled, i.e., improved autonomous movement of the transportation vehicle in everyday traffic.

It goes without saying that exemplary embodiments also comprise a program with a program code for carrying out one of the methods described herein, if the program code is running on or is executed on a computer, a processor or a programmable hardware component (for example, a control unit of a transportation vehicle).

A further disclosed embodiment comprises a device for adjusting a controller of a transportation vehicle, wherein the controller comprises at least one variable controller parameter. In this case, the device comprises a first interface that is arranged to receive transportation vehicle state information and information about a current value of the variable controller parameter. The device further comprises a processor unit that is arranged to calculate a setpoint value for the variable controller parameter on the basis of the transportation vehicle state information and the information about the current value of the variable controller parameter using an artificial neural network. Furthermore, the device comprises a second interface that is arranged to output the setpoint value for the variable controller parameter. The first interface and the second interface can both be a hardware interface and a software interface.

The information required to adjust the variable controller parameter accordingly can thus be provided to the controller by the disclosed device. The adaptability of artificial neural networks can enable a suitable adjustment of the variable controller parameter, i.e., of the control strategy of the controller. For example, by the artificial neural network from the transportation vehicle state information characteristics or peculiarities of a user (driver) can be extracted and taken into account for the calculation of the setpoint value for the variable controller parameter. Accordingly, the control strategy can be adapted to the user. The control can be perceived by the user as adapted to their needs. More generally, the control strategy can be adapted to the variables included in the transportation vehicle state information.

According to some exemplary embodiments, an allowed range of values for the variable controller parameter is specified. The processor unit of the controller is therefore further arranged to check whether the calculated setpoint value for the variable controller parameter is included in the range of values. The controller is thus arranged to check whether the calculated setpoint value is an allowed value for the controller parameter. Owing to the specification of the allowed range of values, the stability and robustness of the controller can be ensured. If the calculated setpoint value for the variable controller parameter is not included in the range of values, the processor unit of the controller is arranged to adjust the variable controller parameter to a value from the allowed range of values with a minimum difference from the calculated setpoint value for the variable controller parameter. The variable controller parameter is thus adjusted to the allowed value that is closest to the actual calculated setpoint value. In this way, the stability and robustness of the controller can be ensured, but also a best possible adjustment of the control strategy to the specific circumstances (for example, the user's wishes).

A further disclosed embodiment includes a control system for a transportation vehicle that, in addition to a device described above for adjusting a controller of a transportation vehicle, comprises a controller with at least one variable control parameter. In this case, the controller is coupled to the device and comprises a third interface that is embodied to receive the setpoint value for the variable control parameter. Furthermore, the controller comprises a processor unit that is arranged to adjust the variable control parameter to the setpoint value for the variable control parameter.

Because of the adaptability of artificial neural networks, an appropriate adjustment of the variable controller parameter, i.e., the control strategy of the controller, can be enabled. For example, characteristics or peculiarities of a user (driver) can be extracted by the artificial neural network from the transportation vehicle state information and taken into account for the calculation of the setpoint value for the variable control parameter. Accordingly, the control strategy of the controller can be adapted to the user. Thus, for example, user-adapted control can be carried out by the controller. The control can therefore be perceived by the user as being adapted to their needs. More generally, the control strategy can be adapted to the variables included in the transportation vehicle state information.

In some exemplary embodiments, an allowed range of values for the variable control parameter is specified. The processor unit of the controller is therefore further arranged to check whether the calculated setpoint value for the variable control parameter is included in the range of values. The controller can thus check whether the calculated setpoint value is within the allowed range of values that ensure the stability and robustness of control. If the calculated setpoint value for the variable control parameter is not included in the range of values, the processor unit of the controller is arranged to adjust the variable control parameter to a value from the allowed range of values with a minimum difference from the calculated setpoint value for the variable control parameter. The variable control parameter is thus adjusted to the allowed value that is closest to the actual calculated setpoint value. In this way, the stability and robustness of the controller can be ensured, but also a best possible adjustment of the control strategy to the specific circumstances (for example, the user's wishes).

According to some exemplary embodiments, the controller comprises a fourth interface that is arranged to send information that the calculated setpoint value for the variable controller parameter is not included in the range of values to the device if the calculated setpoint value for the variable controller parameter is not included in the range of values. The controller can thus give a feedback message to the device. Using the information that the calculated setpoint value for the variable controller parameter is not within the range of values, the device can, for example, check whether the calculation of the setpoint value was erroneous or can carry out an adjustment of the artificial neural network (i.e., the artificial neural network can be trained with the fed back information of the controller).

In FIG. 1, a method 100 for adjusting a controller of a transportation vehicle is shown. Here the controller comprises at least one variable controller parameter. The method 100 includes receiving 102 transportation vehicle state information and information about a current value of the variable controller parameter. As mentioned above, the transportation vehicle state information characterizes a state of the transportation vehicle. Furthermore, the method includes the calculation 104 of a setpoint value for the variable controller parameter on the basis of the transportation vehicle state information and the information about the current value of the variable controller parameter. The calculation of the setpoint value for the variable controller parameter is carried out using an artificial neural network in this case. Further, the method includes outputting 106 the setpoint value for the variable controller parameter.

Because of the adaptability or trainability of artificial neural networks, an appropriate adjustment of the variable controller parameter, i.e., the control strategy of the controller, can be enabled. For example, characteristics or peculiarities of a user can be extracted by the artificial neural network from the transportation vehicle state information and can be taken into account for the calculation of the setpoint value for the variable controller parameter. Accordingly, the control strategy of the controller can be adapted to the user. Thus, for example, user-adapted control can be carried out by the controller. The control can therefore be perceived by the user as being adapted to their needs.

Further details and properties of the method are described above in connection with one or more exemplary embodiments. The method can comprise one or more optional features according to one or more of the exemplary embodiments described here.

Figure 2:
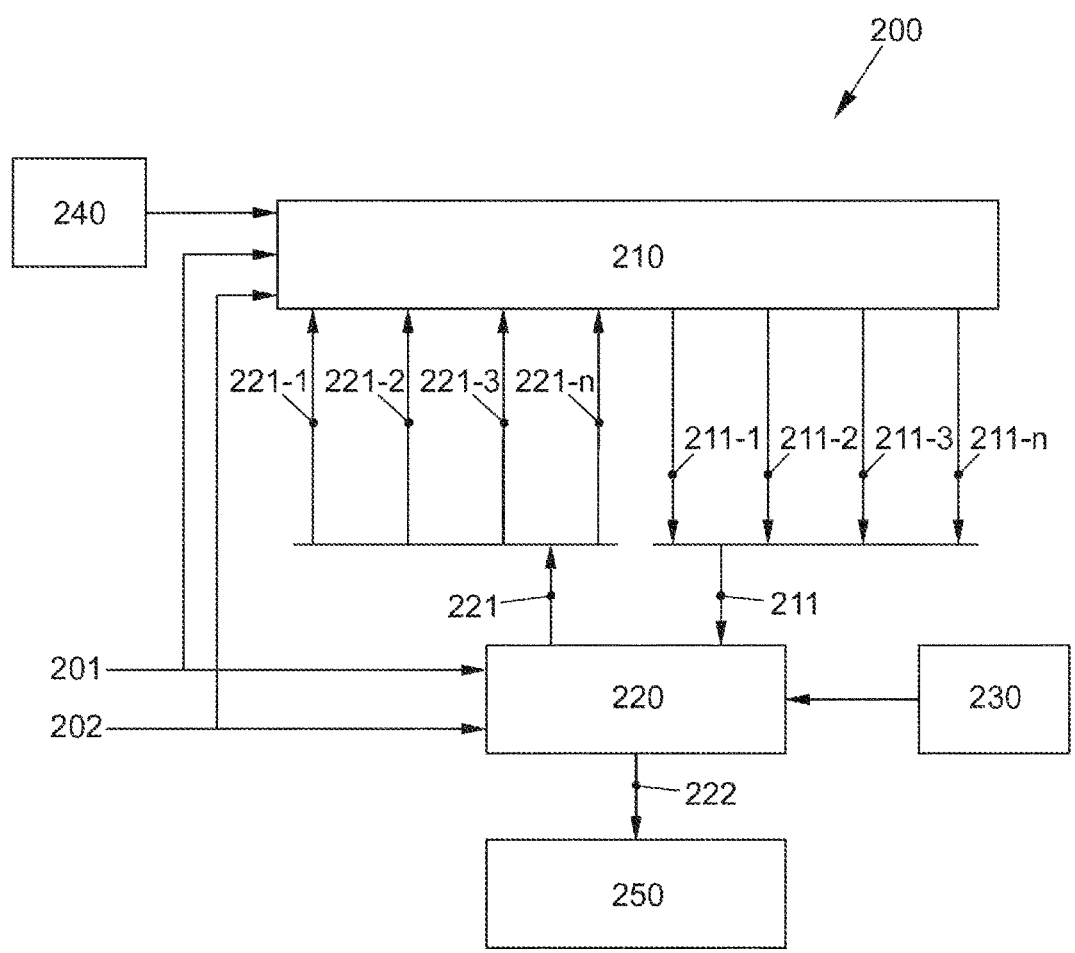
FIG. 2 shows schematically an exemplary embodiment of a control system for a transportation vehicle.

FIG. 2 shows a control system 200 for a transportation vehicle. The control system 200 is shown as a control system of a lane keeping assistance system in the example of FIG. 2. The control system 200 comprises a controller 220 and a device 210 for adjusting a controller of a transportation vehicle. The controller 220 comprises one or more variable controller parameters. In the example shown in FIG. 2, the controller 220 comprises a plurality of variables, i.e., adjustable controller parameters. The controller parameters for a controller of a lane keeping assistance system can, for example, be a length of the view ahead, a degree of intervention, a time of intervention, a maximum steering wheel torque or a degree of turn cutting. Furthermore, the control system 200 comprises a camera 230, with which the position of the transportation vehicle within a lane can be determined. The position information enters the controller 220 as input variables, such as a steering wheel angle 201 and a steering wheel torque 202 of the transportation vehicle. Depending on the input variables entering the controller 220, the controller determines an additional (additive) torque that is input to the electrical power steering 250 of the transportation vehicle in addition to the steering wheel torque transmitted by the user as input variables to adjust a suitable steering angle of the transportation vehicle.

The device 210 comprises a first interface for receiving transportation vehicle state information and information about a current value of the variable controller parameter. The device 210 receives the current values of the variable controller parameter from the controller 220. The controller 220 outputs a set of output values 221. The set of output values 221 can issue further output values 221-1, 221-3, . . . , 221-n of the controller 220 to the device 210 in addition to the current value of the variable controller parameter. For example, the further output values can specify a correction of the lane output by the lane keeping assistance system by the user of the transportation vehicle or an oversteering input of the user to the steering wheel. In addition to the set of output values 221, the device 210 also receives the steering wheel angle 201 and the steering wheel torque 202 via the first interface. The device 210 also receives road data and information about a current position of the transportation vehicle 240 via the first interface. In addition to the information indicated in FIG. 2, the device 210 can optionally receive further information—for example, information about a user of the transportation vehicle (e.g., specific transportation vehicle settings, steering characteristic, pedal characteristic).

The device 210 can determine therefrom a deviation of the current control by the controller 220 from an actual control wish of the user. For example, if the controller 220 of the lane keeping assistance system wishes to keep the transportation vehicle in the middle of the lane in a turn, but the user wishes to cut the turn within his lane, the device 210 detects deviations of the actual lane from the lane proposed by the lane keeping assistance system, for example, or even a steering wheel torque with which the wheel is steering "against" the lane keeping assistance system (and is thus exceeding the steering wheel torque that the user would have to apply when driving without a lane keeping assistance system).

Based on the received transportation vehicle state information and the information about the current value of the variable controller parameter, a processor device of the device 210 calculates a (changed) setpoint value for at least one of the variable controller parameters of the controller 220 using an artificial neural network. The setpoint values for the controller parameter are output to the controller 220 as a set of setpoint values for controller parameters 211 via a second interface. Depending on the number of variable controller parameters of the controller 220, a setpoint value 211-1 for a first controller parameter of the controller 220 and optionally further setpoint values 211-2, 211-3, . . . , 211-n for further controller parameters of the controller 220 are output to the controller via the second interface.

Following on from the above example of cornering, setpoint values for the controller parameter of the controller 220 can be calculated so that the controller 220 of the lane keeping assistance system will guide the transportation vehicle in upcoming turns more to the side of the lane on the inside of the turn. Similarly for example, the positioning of the transportation vehicle can be adjusted by the controller 220 of the lane keeping assistance system during straight-ahead travel. This means that whether the transportation vehicle is to be steered more to the left, in the center or more to the right in the lane can be adjusted.

The controller 220 receives the calculated setpoint values for the controller parameter via a third interface and a processor unit of the controller 220 adjusts the variable controller parameter to the respective setpoint value. The control by the lane keeping assistance system can thus be adapted to the needs the user of the transportation vehicle.

As already indicated above, both the device 210 and the controller 220 can be embodied to check whether the setpoint values for the controller parameter calculated by the device 210 are included in the respective allowed ranges of values. In this way, it can be ensured that the controller 220 only operates with sets of parameters that guarantee the robustness and stability of the controller 220.

REFERENCE CHARACTER LIST 100 method for adjusting a controller of a transportation vehicle
102 receiving transportation vehicle state information and information about a current value of the variable controller parameter
104 calculation of a setpoint value for the variable controller parameter
106 outputting the setpoint value for the variable controller parameter
100 control system for a transportation vehicle
201 steering wheel angle
202 steering wheel torque
210 device for adjusting a controller of a transportation vehicle
211 set of setpoint values for controller parameter
211-1 setpoint value for first controller parameter
211-2 setpoint value for second controller parameter
211-3 setpoint value for third controller parameter
211-n setpoint value for nth controller parameter
220 controller
221 set of output values of the controller
221-1 first output value of the controller
221-2 second output value of the controller
221-3 third output value of the controller
221-4 nth output value of the controller
222 additional torque for electrical power steering
230 camera
240 road data and information about a current position of the transportation vehicle
250 electrical power steering

The invention claimed is:

1. A method for adjusting a controller of a transportation vehicle, comprising:
receiving transportation vehicle state information and information about a current value of at least one variable controller parameter of the controller;
calculating a setpoint value for the at least one variable controller parameter using an artificial neural network based on the transportation vehicle state information and the information about the current value of the at least one variable controller parameter, the calculation further including (i) checking whether the calculated setpoint value for the at least one variable controller parameter is within a specified allowed range of values for the at least one variable controller parameter and (ii) changing the calculated setpoint value to a value within the allowed range of values in response to the calculated setpoint value for the at least one variable controller parameter not being included in the range of values; and
outputting the setpoint value for the at least one variable controller parameter,
wherein the controller is configured to adjust the at least one variable controller parameter in order to control a vehicle system of the transportation vehicle, and
wherein the value within the allowed range of values is within a minimum difference from the calculated setpoint value for the at least one variable controller parameter.

2. The method of claim 1, further comprising:
receiving the setpoint value for the at least one variable controller parameter by the controller; and
adjusting the at least one variable controller parameter to the setpoint value for the at least one variable controller parameter by the controller.

3. The method of claim 2, further comprising:
adjusting the at least one variable controller parameter to a value from the allowed range of values with a minimum difference from the calculated setpoint value for the at least one variable controller parameter by the controller in response to the calculated setpoint value for the variable controller parameter not being included in the range of values.

4. The method of claim 1, wherein the transportation vehicle state information includes a deviation of an actual value from a setpoint value of the at least one variable controlled by the controller and/or a steering wheel angle and/or a steering wheel torque and/or a position of a transportation vehicle pedal and/or a speed of the transportation vehicle and/or a position of the transportation vehicle within a lane.

5. The method of claim 1, further comprising receiving information about a user of the transportation vehicle, and wherein the calculation of the setpoint value for the variable controller parameter is further based on the information about the user of the transportation vehicle.

6. The method of claim 5, wherein the information about the user of the transportation vehicle includes a transportation vehicle setting of the user and/or a steering characteristic of the user and/or a pedal characteristic of the user.

7. The method of claim 1, further comprising receiving road data and information about a current position of the transportation vehicle, and wherein the calculation of the setpoint value for the at least one variable controller parameter is further based on the road data and the information about the current position of the transportation vehicle.

8. The method of claim 7, wherein the road data includes a radius of a turn and/or a length of a turn.

9. The method of claim 1, wherein the controller is a controller of a driver assistance system.

10. A device for adjusting a controller of a transportation vehicle, comprising:

a first interface that receives transportation vehicle state information and information about a current value of at least one variable controller parameter of the controller, the controller configured to output at least the information about the current value of the at least one variable controller parameter in order to control a vehicle system of the transportation vehicle;

a processor unit that calculates a setpoint value for the at least one variable controller parameter based on the transportation vehicle state information and the information about the current value of the at least one variable controller parameter using an artificial neural network, the processor unit further configured to (i) check whether the calculated setpoint value for the at least one variable controller parameter is included in a specified allowed range of values for the at least one variable controller parameter and (ii) change the calculated setpoint value to a value within the allowed range of values in response to the calculated setpoint value for the at least one variable controller parameter not being included in the range of values; and a second interface that outputs the setpoint value for the at least one variable controller parameter, wherein the value within the allowed range of values is within a minimum difference from the calculated setpoint value for the at least one variable controller parameter.

11. A control system for a transportation vehicle, the control system comprising:

a device according to claim 10, wherein the controller with at least one variable controller parameter is coupled to the device, and wherein the controller comprises a third interface embodied to receive the setpoint value for the at least one variable controller parameter, and wherein the processor unit is configured to adjust the variable controller parameter to the setpoint value for the at least one variable controller parameter.

12. The control system of claim 11, wherein the processor unit of the controller:

adjusts the at least one variable controller parameter to a value from the allowed range of values with a minimum difference from the calculated setpoint value for the at least one variable controller parameter in response to the calculated setpoint value of the at least one variable controller parameter not being included in the range of values.

13. The control system of claim 12, comprising a fourth interface, wherein the fourth interface sends information to the device that the calculated setpoint value for the at least one variable controller parameter is not included in the range of values in response to the calculated setpoint value for the at least one variable controller parameter not being included in the range of values.

* * * * *